United States Patent
Qiao et al.

(10) Patent No.: US 12,111,943 B2
(45) Date of Patent: Oct. 8, 2024

(54) ENHANCED SECURITY MECHANISM FOR FILE ACCESS

(71) Applicant: Citrix Systems, Inc., Fort Lauderdale, FL (US)

(72) Inventors: Zongpeng Qiao, Nanjing/Jiangsu (CN); Xiaolu Chu, Nanjing/Jiangsu (CN); Ke Xu, Nanjing (CN); Ze Chen, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 1106 days.

(21) Appl. No.: 16/942,142

(22) Filed: Jul. 29, 2020

(65) Prior Publication Data

US 2022/0035933 A1 Feb. 3, 2022

Related U.S. Application Data

(63) Continuation of application No. PCT/CN2020/100679, filed on Jul. 7, 2020.

(51) Int. Cl.
| | |
|---|---|
| *G06F 21/62* | (2013.01) |
| *G06F 9/54* | (2006.01) |
| *G06F 16/16* | (2019.01) |
| *G06F 21/31* | (2013.01) |
| *G06F 8/61* | (2018.01) |

(52) U.S. Cl.
CPC .......... *G06F 21/6209* (2013.01); *G06F 9/542* (2013.01); *G06F 16/168* (2019.01); *G06F 21/31* (2013.01); *G06F 21/62* (2013.01); *G06F 8/61* (2013.01)

(58) Field of Classification Search
CPC .... G06F 21/6209; G06F 9/542; G06F 16/168; G06F 21/31; G06F 21/62; G06F 8/61; G06F 2009/45579; G06F 9/452; G06F 9/45558

See application file for complete search history.

(56) References Cited

U.S. PATENT DOCUMENTS

| | | | | |
|---|---|---|---|---|
| 2010/0011448 | A1* | 1/2010 | Wagner | H04L 63/10 709/204 |
| 2015/0326538 | A1* | 11/2015 | Keane | H04L 63/0428 713/168 |
| 2018/0139131 | A1* | 5/2018 | Ignatchenko | H04L 47/32 |
| 2019/0028277 | A1* | 1/2019 | Jayachandran | H04L 9/3247 |
| 2019/0278339 | A1* | 9/2019 | Cooper | G06F 1/3293 |
| 2021/0174218 | A1* | 6/2021 | Miller | G06N 20/00 |

\* cited by examiner

*Primary Examiner* — Cheng-Feng Huang

(57) ABSTRACT

Methods and systems for providing secure file sharing are described herein. A computing device may receive data from a resource provider in response to a request received by the resource provider. The data may include information about a user of a client device that made the request for a file and information about the file, and the request may be for access to the file and made by the user with an owner of the requested file being unknown to the user. The computing device may parse the received data to identify a subset of data. The subset of data may be configured to enable the owner to determine whether to permit the user to access to the file. Further, the computing device may provide a notification, which includes at least some of the subset of data, to an endpoint device of the owner.

20 Claims, 14 Drawing Sheets

ENHANCED SECURITY MECHANISM FOR FILE ACCESS

CROSS-REFERENCE TO RELATED APPLICATIONS

This application is a continuation of co-pending International Application No. PCT/CN2020/100679, entitled "ENHANCED SECURITY MECHANISM FOR FILE ACCESS," filed on Jul. 17, 2020. The content of which is incorporated herein by reference in its entirety.

FIELD

Aspects described herein generally relate to computer networking, remote computer access, cloud computing systems, and hardware and software related thereto. More specifically, one or more aspects describe herein provide secure access to shared data in a network environment.

BACKGROUND

File sharing is a practice of providing local or remote access to digital files such as audio files, videos, documents, and the like. Sharing a file with another party can be performed via file transfer protocol (FTP), flash drive, or email attachment. Today, an increasing number of files are shared online via cloud storage platforms. Specifically, employees often collaborate and engage with each other via online collaboration tools like ShareFile, Google Drive, etc. In general, file sharing greatly improves productivity and efficiency.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

File sharing may involve a security risk. Generally, an online shared file is accessible to everyone under the same enterprise. However, if an employee is working on an important confidential project, the current file sharing mechanism may have security issues. If a file owner does not intend an online file to be accessible to everyone, the file owner may authorize only a group of users to access the file. For example, if the file owner wants to share the file with a specific group of people, the file owner may need to create a link to the file, and send the link to the group of people via an email. However, it may be cumbersome and inconvenient for the file owner to know who may be interested or authorized to view or edit the file before uploading the file to an information storage platform (e.g., ShareFile, Box, Google Drive). In addition, the file owner may not be able to control the sharing of the link. Therefore, anyone with the link may be able to access the file or share the link with others, which may cause serious security problems. Thus, there remains a need to provide an easier and more secure way of sharing files online.

To overcome limitations described above, and to overcome other limitations that will be apparent upon reading and understanding the present specification, aspects described herein are directed towards an enhanced security mechanism and method for file sharing.

In an embodiment of the present disclosure, a method may be provided for secure file sharing. In the method, a request to access a file may be received by a computing device. The file may be stored on a network storage device accessible by the computing device. An identity of a first user associated with the file may be hidden from at least a second user of the request. Information about the second user and file information may be retrieved from the request. A notification may be sent to a first user device of the first user. The notification may comprise the information about the second user and the file information. In addition, a response from the first user device may be received. The response may comprise an indication of approval or denial of the request. Further, in response to approval of the request, the second user may be permitted to access the file, or in response to denial of the request, the second user may be prevented from accessing the file.

In an embodiment of the present disclosure, an apparatus may be provided for secure file sharing. The apparatus comprises one or more processors; and memory storing instructions that, when executed by the one or more processors, cause the apparatus to receive a request to access a file. The file may be stored on a network storage device accessible by the apparatus. An identity of a first user associated with the file may be hidden from at least a second user of the request. The instructions may further cause the apparatus to retrieve, from the request, information of the second user and file information. The instructions may further cause the apparatus to send a notification to a first user device of the first user. The notification may comprise the information of the second user and the file information. Further, the instructions may cause the apparatus to receive a response from the first user device. The response may comprise an indication of approval or denial of the request. In response to approval of the request, the instructions may cause the apparatus to permit the second user to access the file, or in response to denial of the request, the instructions may cause the apparatus to prevent the second user from accessing the file.

In an embodiment of the present disclosure, a method may be provided for secure file sharing. In the method, data from a resource provider may be received by a computing device in response to a request received by the resource provider. The data may include information about a user of a client device that made the request for a file and information about the file. The request may be for access to the file and made by the user with an owner of the requested file being unknown to the user. The received data may be parsed by the computing device to identify a subset of data. The subset of data may be configured to enable the owner to determine whether to permit the user to access to the file. Further, a notification may be provided, by the computing device, to an endpoint device of the owner. The notification may include at least some of the subset of data.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards an enhanced security mechanism and method for anonymous file access. A file requester may send a file access request for a file stored on a network storage device. The file access request may be sent to a user client of the file owner. The file owner may approve or deny the file access request based on the information included with the file access request. As a result, the file owner can control the access of the file and provide real-time action (e.g., approval) on the file access request. Further, the file owner's identity may not be available to the file requester, which provides enhanced security for the file owner.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect mounting, connecting, coupling, positioning and engaging.

Computing Architecture

Figure 1:
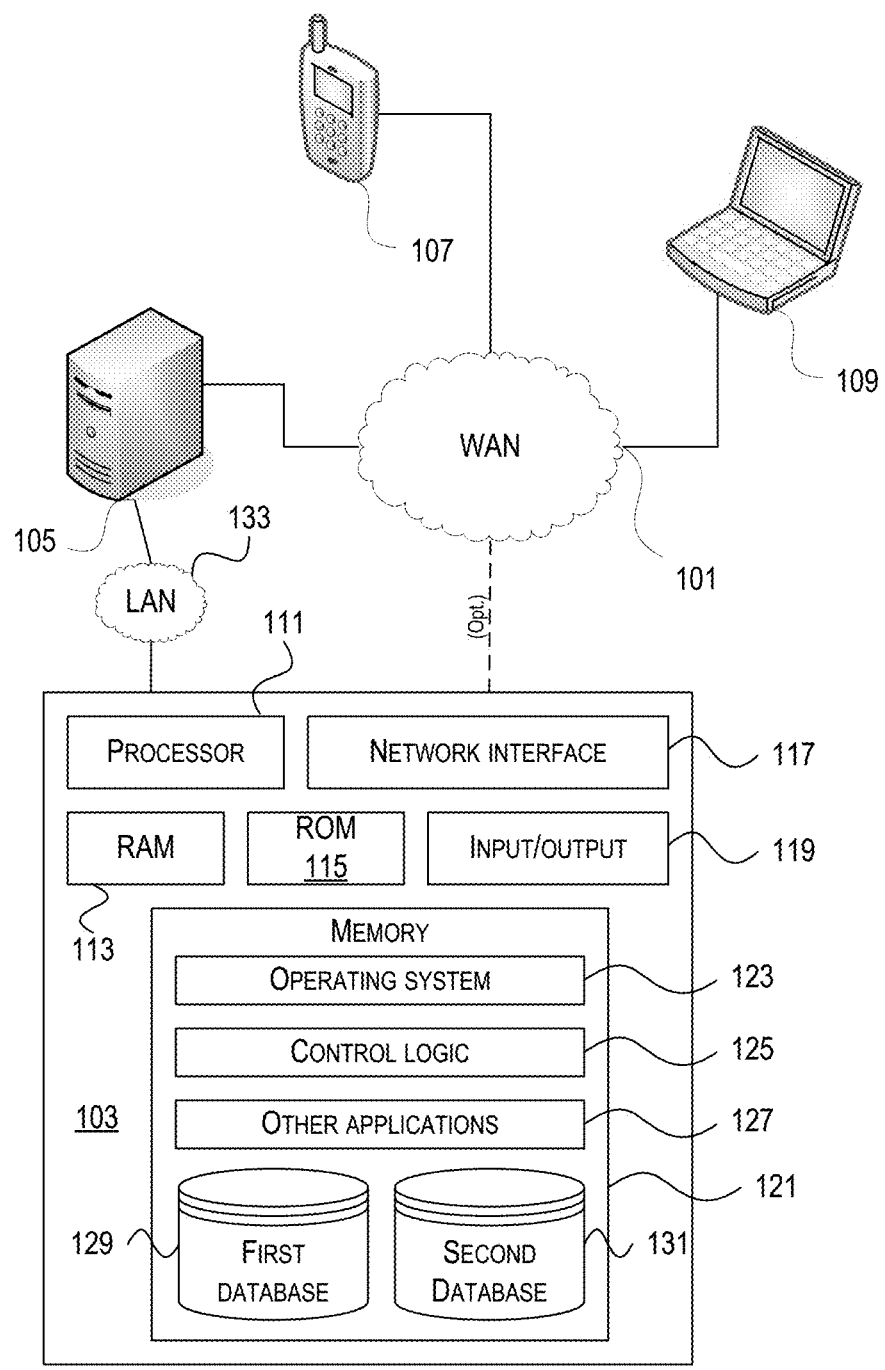
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through local area network 133, wide area network 101 (e.g., the Internet), via direct or indirect connection, or via some other network. Users may interact with the data server 103 using remote computers 107, 109, e.g., using a web browser to connect to data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of data processing device 103, control logic 125 for instructing data server 103 to perform aspects described herein, and other application software 127 providing secondary, support, and/or other functionality which may or might not be used in conjunction with aspects described herein. Control logic 125 may also be referred to herein as data server software 125. Functionality of data server software 125 may refer to operations or decisions made automatically based on rules coded into control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, first database 129 may include second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
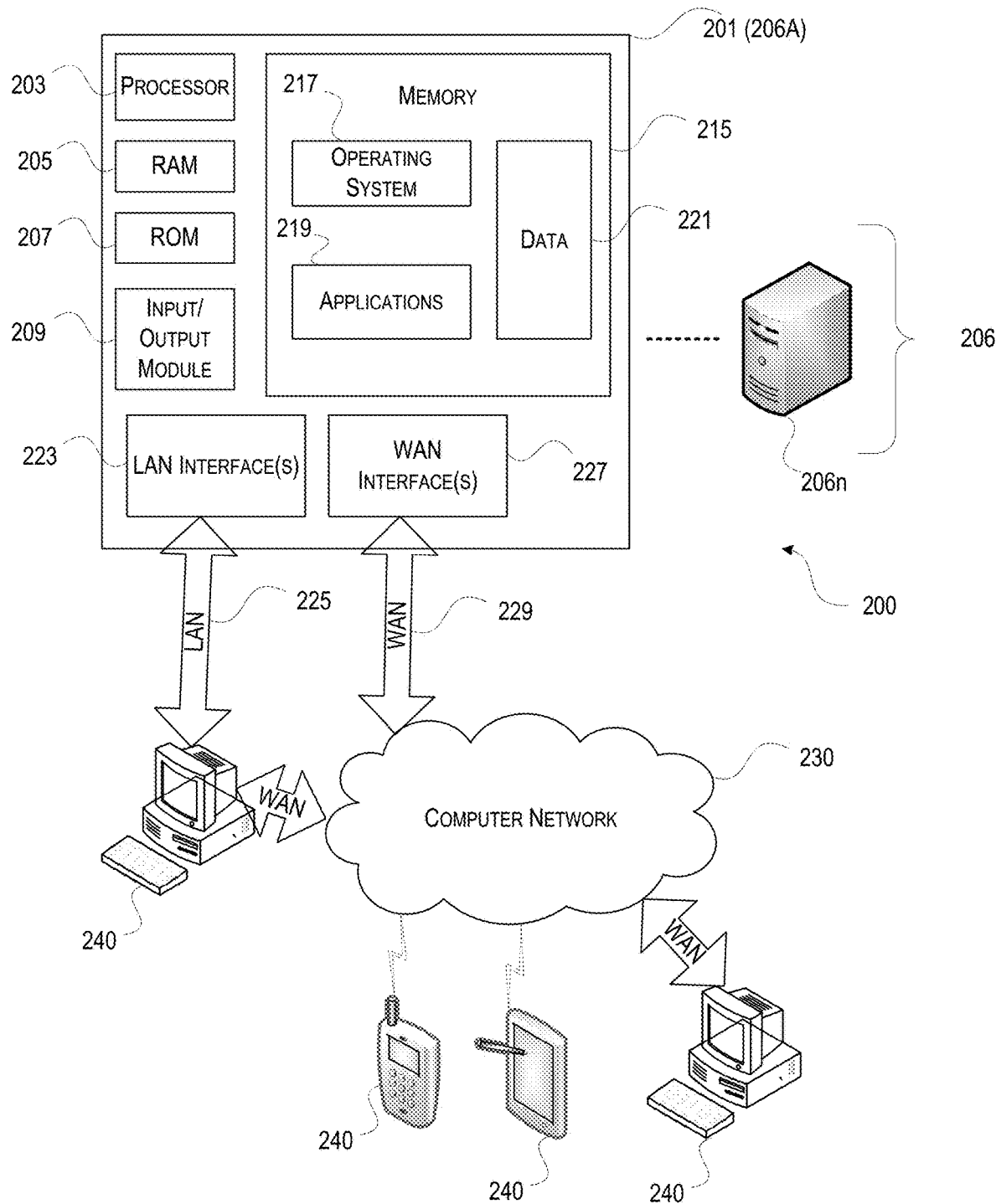
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. Computing device 201 may have a processor 203 for controlling overall operation of computing device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by computing device 201, such as an operating system 217, application programs 219, and an associated database 221.

Computing device 201 may operate in a networked environment supporting connections to one or more remote computers, such as terminals 240 (also referred to as client devices and/or client machines). Terminals 240 may be personal computers, mobile devices, laptop computers, tablets, or servers that include many or all of the elements described above with respect to computing device 103 or 201. The network connections depicted in FIG. 2 include a local area network (LAN) 225 and a wide area network (WAN) 229, but may also include other networks. When used in a LAN networking environment, computing device 201 may be connected to LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

Server 206, in some embodiments, uses a remote presentation protocol or other program to send data to a thin-client or remote-display application executing on the client to present display output generated by an application executing on server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. Server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments server farm 206 may be administered as a single entity, while in other embodiments server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by client machine 240 with a response from second server 206b (not shown.) First server 206a may acquire an enumeration of applications available to client machine 240 as well as address information associated with an application server 206 hosting an application identified within the enumeration of applications. First server 206a can then present a response to the client's request using a web interface, and communicate directly with client 240 to provide client 240 with access to an identified application. One or more clients 240 and/or one or more servers 206 may transmit data over network 230, e.g., network 101.

Figure 3:
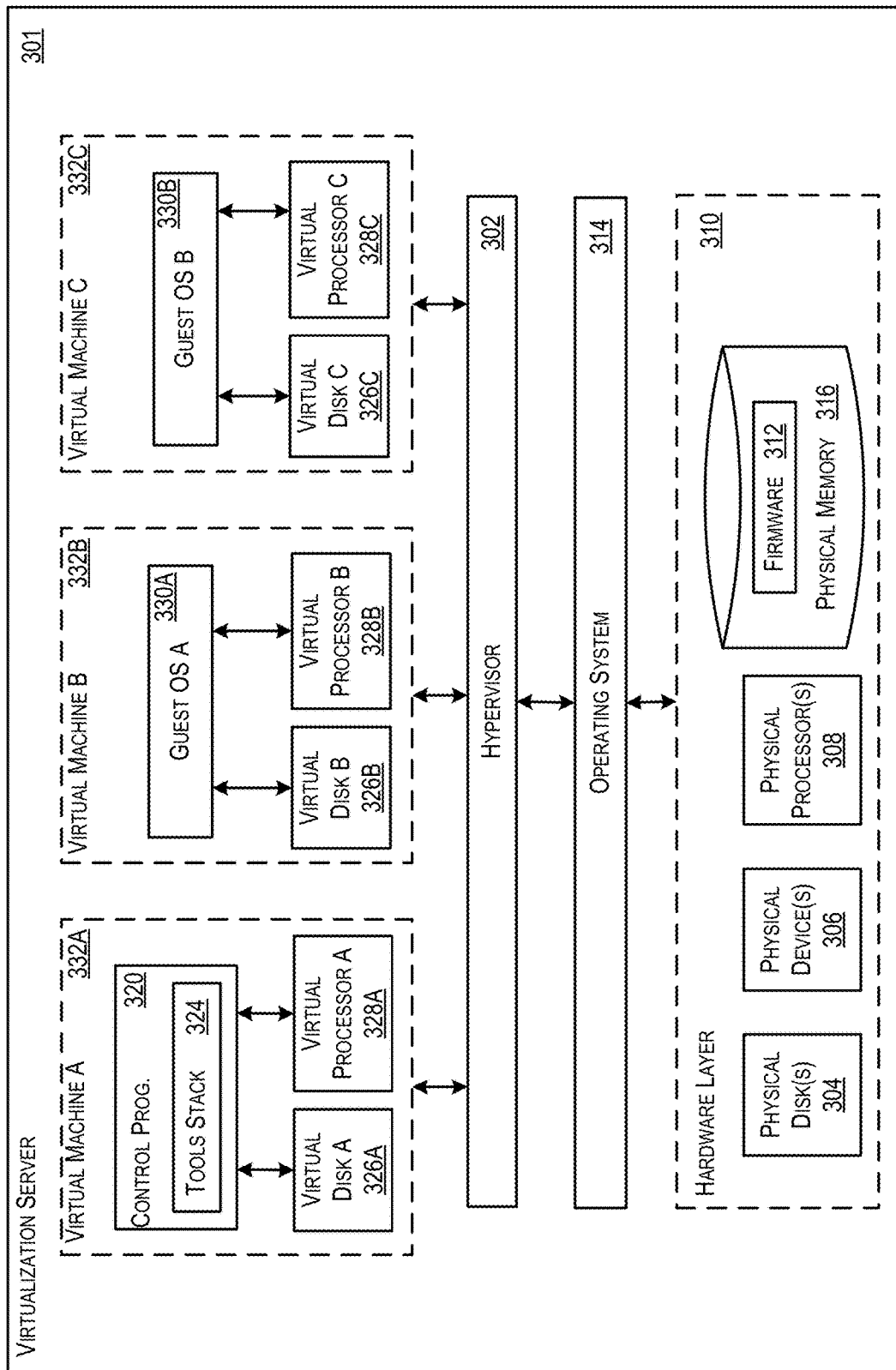
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in physical memory 316 and can be executed by one or more of physical processors 308. Virtualization server 301 may further include an operating system 314 that may be stored in a memory element in physical memory 316 and executed by one or more of physical processors 308. Still further, a hypervisor 302 may be stored in a memory element in physical memory 316 and can be executed by one or more of physical processors 308.

Executing on one or more of physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 3 illustrates an embodiment where firmware 312 is stored within physical memory 316 of virtualization server 301. Programs or executable instructions stored in physical memory 316 can be executed by one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on virtualization server 301. Virtual machines may then execute at a level above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within the hardware layer 310. That is, while a Type 2 hypervisor 302 accesses system resources through a host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, can provide virtual resources to operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, virtualization server 301 may be referred to as a host server. An example of such a virtualization server is the Citrix Hypervisor provided by Citrix Systems, Inc., of Fort Lauderdale, Florida.

Hypervisor 302 may create one or more virtual machines 332B-C (generally 332) in which guest operating systems 330 execute. In some embodiments, hypervisor 302 may load a virtual machine image to create a virtual machine 332. In other embodiments, hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to virtual machine 332.

As shown in FIG. 3, virtualization server 301 may host or execute one or more virtual machines 332. A virtual machine 332 is a set of executable instructions that, when executed by a processor 308, may imitate the operation of a physical computer such that virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include a virtual disk 326A-C (generally 326) and a virtual processor 328A-C (generally 328.) Virtual disk 326, in some embodiments, is a virtualized view of one or more physical disks 304 of virtualization server 301, or a portion of one or more physical disks 304 of virtualization server 301. The virtualized view of physical disks 304 can be generated, provided, and managed by hypervisor 302. In some embodiments, hypervisor 302 provides each virtual machine 332 with a unique view of the physical disks 304. Thus, in these embodiments, particular virtual disk 326 included in each virtual machine 332 can be unique when compared with other virtual disks 326.

A virtual processor 328 can be a virtualized view of one or more physical processors 308 of virtualization server 301. In some embodiments, the virtualized view of physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of virtual processor 328 are different than the characteristics of the corresponding physical processor 308.

Figure 4:
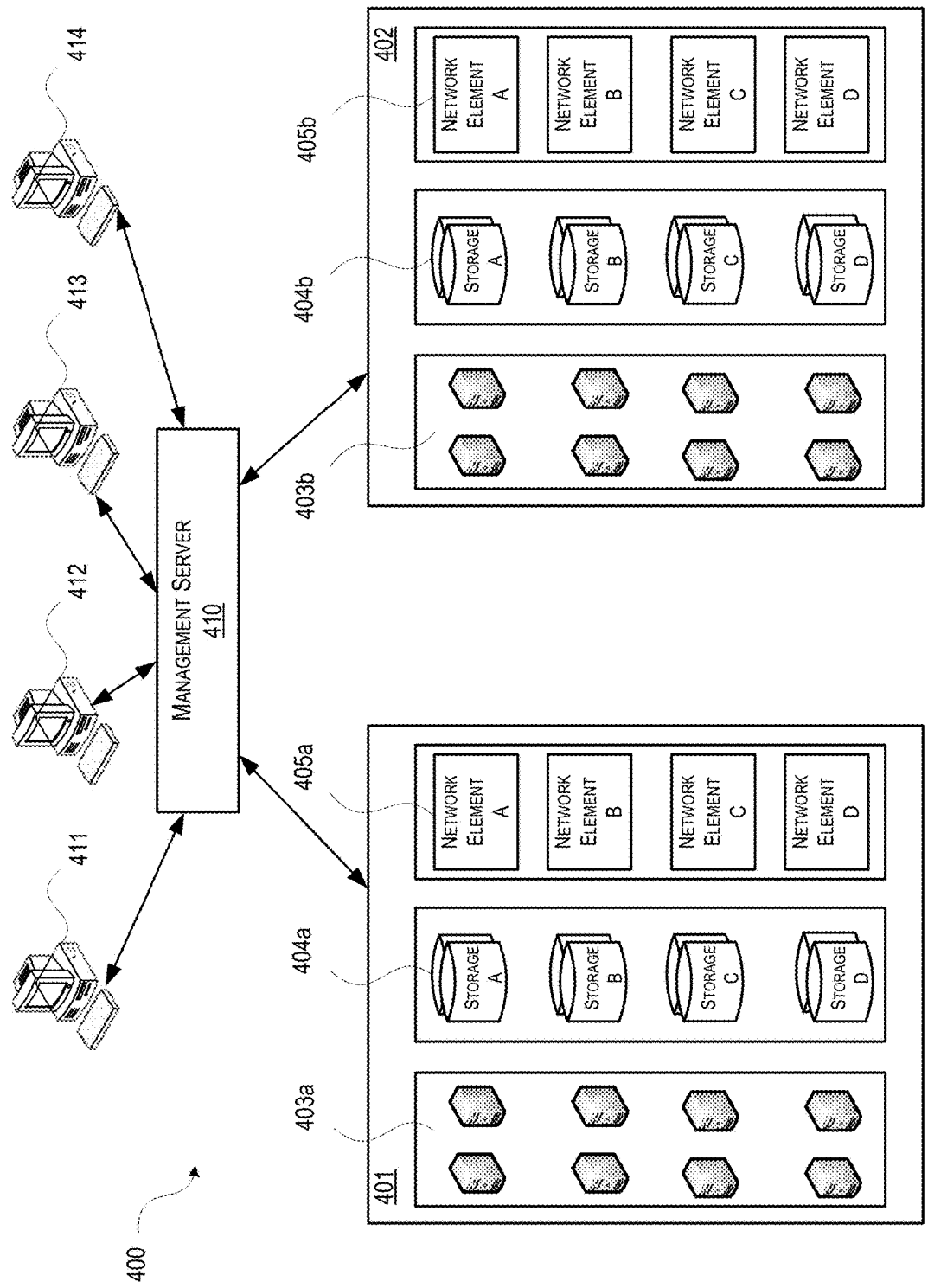
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. Management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, management server 410 may include a resource manager configured to select and provision physical resources in the hardware layer of the cloud system based on the client requests. For example, management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. Management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Figure 5A:
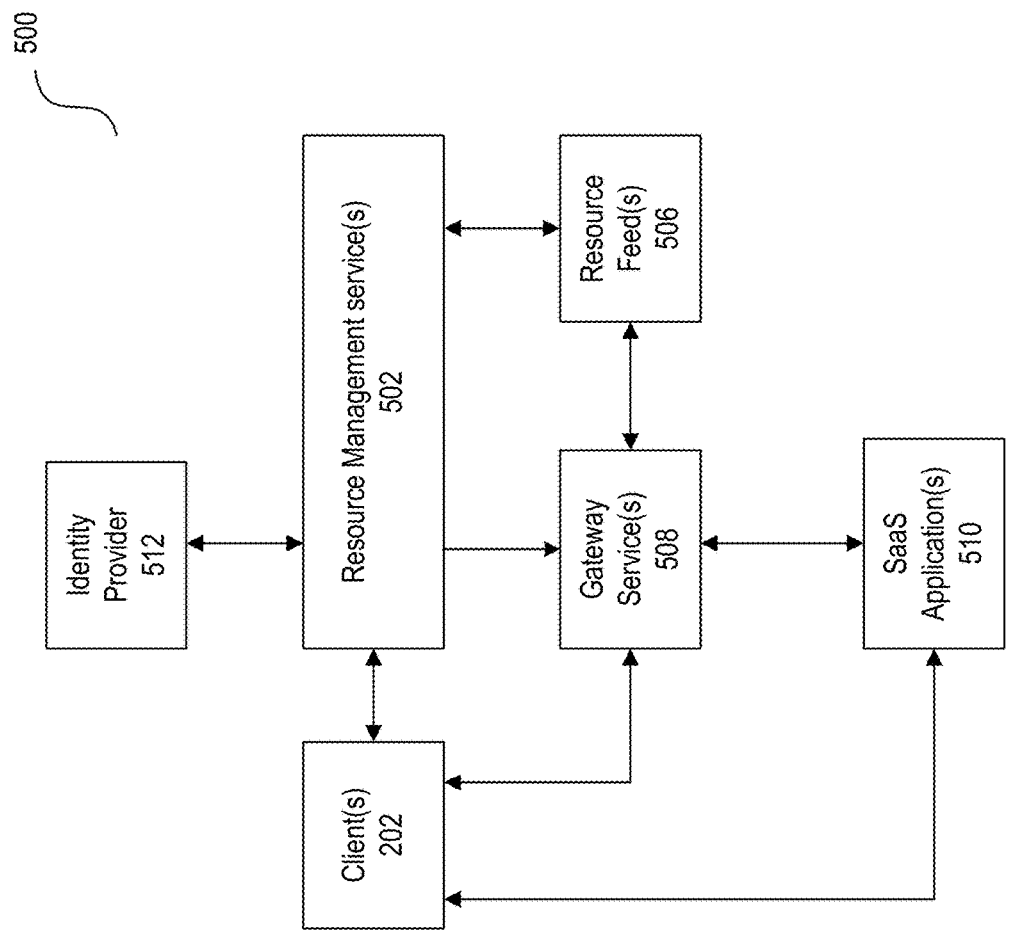
FIG. 5A is a block diagram of an example system in which resource management services may manage and streamline access by clients to resource feeds (via one or more gateway services) and/or software-as-a-service (SaaS) applications.

FIG. 5A is a block diagram of an example system 500 in which one or more resource management services 502 may manage and streamline access by one or more clients 202 to one or more resource feeds 506 (via one or more gateway services 508) and/or one or more software-as-a-service (SaaS) applications 510. In particular, resource management service(s) 502 may employ an identity provider 512 to authenticate the identity of a user of a client 202 and, following authentication, identify one or more resources the user is authorized to access. In response to the user selecting one of the identified resources, resource management service(s) 502 may send appropriate access credentials to requesting client 202, and client 202 may then use those credentials to access the selected resource. For the resource feed(s) 506, client 202 may use the supplied credentials to access the selected resource via a gateway service 508. For SaaS application(s) 510, client 202 may use the credentials to access the selected application directly.

The client(s) 202 may be any type of computing devices capable of accessing the resource feed(s) 506 and/or the SaaS application(s) 510, and may, for example, include a variety of desktop or laptop computers, smartphones, tablets, etc. The resource feed(s) 506 may include any of numerous resource types and may be provided from any of numerous locations. In some embodiments, for example, the resource feed(s) 506 may include one or more systems or services for providing virtual applications and/or desktops to the client(s) 202, one or more file repositories and/or file sharing systems, one or more secure browser services, one or more access control services for the SaaS applications 510, one or more management services for local applications on the client(s) 202, one or more internet enabled devices or sensors, etc. Each of the resource management service(s) 502, the resource feed(s) 506, the gateway service(s) 508, the SaaS application(s) 510, and the identity provider 512 may be located within an on-premises data center of an organization for which the system 500 is deployed, within one or more cloud computing environments, or elsewhere.

Figure 5B:
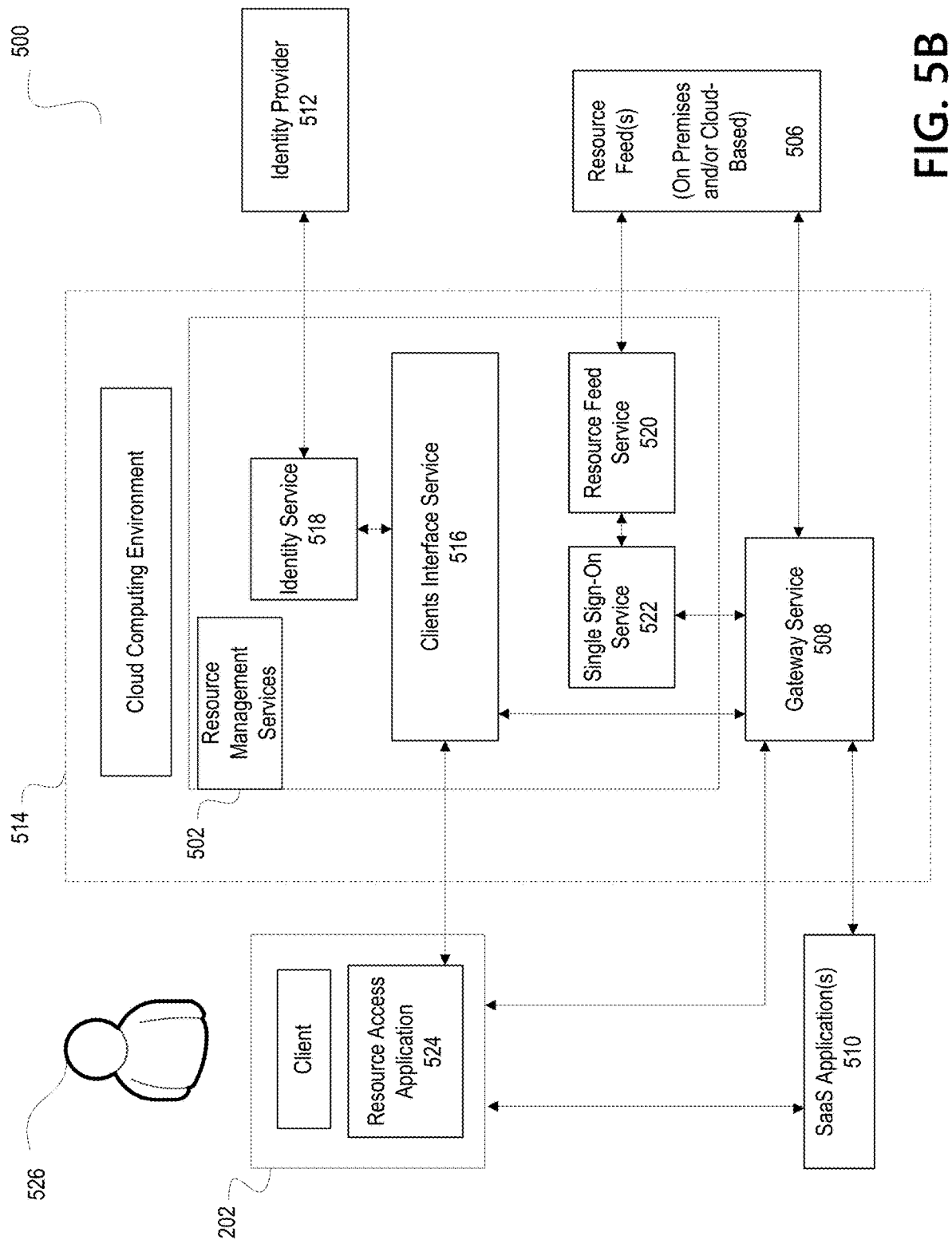
FIG. 5B is a block diagram showing an example implementation of the system shown in FIG. 5A in which various resource management services as well as a gateway service are located within a cloud computing environment.

FIG. 5B is a block diagram showing an example implementation of the system 500 shown in FIG. 5A in which various resource management services 502 as well as a gateway service 508 are located within a cloud computing environment 514. The cloud computing environment may, for example, include Microsoft Azure Cloud, Amazon Web Services, Google Cloud, or IBM Cloud.

For any of illustrated components (other than client 202) that are not based within cloud computing environment 514, cloud connectors (not shown in FIG. 5B) may be used to interface those components with cloud computing environment 514. Such cloud connectors may, for example, run on Windows Server instances hosted in resource locations and may create a reverse proxy to route traffic between the site(s) and cloud computing environment 514. In the illustrated example, the cloud-based resource management services 502 include a client interface service 516, an identity service 518, a resource feed service 520, and a single sign-on service 522. As shown, in some embodiments, client 202 may use a resource access application/platform 524 to communicate with client interface service 516 as well as to present a user interface on the client 202 that a user 526 can operate to access resource feed(s) 506 and/or SaaS application(s) 510. The resource access application 524 may either be installed on client 202, or may be executed by client interface service 516 (or elsewhere in system 500) and accessed using a web browser (not shown in FIG. 5B) on client 202.

As explained in more detail below, in some embodiments, resource access application 524 and associated components may provide user 526 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 524 is launched or otherwise accessed by user 526, client interface service 516 may send a sign-on request to identity service 518. In some embodiments, identity provider 512 may be located on the premises of the organization for which system 500 is deployed. Identity provider 512 may, for example, correspond to an on-premises Windows Active Directory. In such embodiments, identity provider 512 may be connected to cloud-based identity service 518 using a cloud connector (not shown in FIG. 5B), as described above. Upon receiving a sign-on request, identity service 518 may cause the resource access application 524 (via client interface service 516) to prompt user 526 for the user's authentication credentials (e.g., user-name and password). Upon receiving the user's authentication credentials, client interface service 516 may pass the credentials along to identity service 518, and identity service 518 may, in turn, forward them to identity provider 512 for authentication, for example, by comparing them against an Active Directory domain. Once identity service 518 receives confirmation from identity provider 512 that the user's identity has been properly authenticated, client interface service 516 may send a request to resource feed service 520 for a list of subscribed resources for user 526.

In other embodiments (not illustrated in FIG. 5B), identity provider 512 may be a cloud-based identity service, such as a Microsoft Azure Active Directory. In such embodiments, upon receiving a sign-on request from client interface service 516, identity service 518 may, via client interface service 516, cause client 202 to be redirected to the cloud-based identity service to complete an authentication process. The cloud-based identity service may then cause client 202 to prompt user 526 to enter the user's authentication credentials. Upon determining the user's identity has been properly authenticated, the cloud-based identity service may send a message to resource access application 524 indicating the authentication attempt was successful, and resource access application 524 may then inform the client interface service 516 of the successfully authentication. Once the identity service 518 receives confirmation from client interface service 516 that the user's identity has been properly authenticated, client interface service 516 may send a request to resource feed service 520 for a list of subscribed resources for user 526.

For each configured resource feed, resource feed service 520 may request an identity token from the single sign-on service 522. Resource feed service 520 may then pass the feed-specific identity tokens it receives to the points of authentication for respective resource feeds 506. Each resource feed 506 may then respond with a list of resources configured for the respective identity. Resource feed service 520 may then aggregate all items from the different feeds and forward them to client interface service 516, which may cause resource access application 524 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., ShareFile®, one or more secure browsers, one or more internet enabled devices or sensors, one or more local applications installed on client 202, and/or one or more SaaS applications 510 to which user 526 has subscribed). The lists of local applications and SaaS applications 510 may, for example, be supplied by resource feeds 506 for respective services that manage which such applications are to be made available to user 526 via resource access application 524. Examples of SaaS applications 510 that may be managed and accessed as described herein include Microsoft Office 365 applications, SAP SaaS applications, Workday applications, etc.

For resources other than local applications and SaaS application(s) 510, upon user 526 selecting one of the listed available resources, resource access application 524 may cause client interface service 516 to forward a request for the specified resource to resource feed service 520. In response to receiving such a request, resource feed service 520 may request an identity token for the corresponding feed from the single sign-on service 522. The resource feed service 520 may then pass the identity token received from single sign-on service 522 to client interface service 516 where a launch ticket for the resource may be generated and sent to resource access application 524. Upon receiving the launch ticket, resource access application 524 may initiate a secure session to gateway service 508 and present the launch ticket. When gateway service 508 is presented with the launch ticket, it may initiate a secure session to the appropriate resource feed and present the identity token to that feed to seamlessly authenticate user 526. Once the session initializes, client 202 may proceed to access the selected resource.

When user 526 selects a local application, resource access application 524 may cause the selected local application to launch on client 202. When user 526 selects a SaaS application 510, resource access application 524 may cause client interface service 516 request a one-time uniform resource locator (URL) from gateway service 508 as well a preferred browser for use in accessing SaaS application 510. After gateway service 508 returns the one-time URL and identifies the preferred browser, client interface service 516 may pass that information along to resource access application 524. Client 202 may then launch the identified browser and initiate a connection to the gateway service 508. Gateway service 508 may then request an assertion from single sign-on service 522. Upon receiving the assertion, gateway service 508 may cause the identified browser on client 202 to be redirected to the logon page for identified SaaS application 510 and present the assertion. The SaaS may then contact gateway service 508 to validate the assertion and authenticate user 526. Once the user has been authenticated, communication may occur directly between the identified browser and selected SaaS application 510, thus allowing user 526 to use client 202 to access selected SaaS application 510.

In some embodiments, the preferred browser identified by the gateway service 508 may be a specialized browser embedded in resource access application 524 (when the resource application is installed on client 202) or provided by one of resource feeds 506 (when resource application 524 is located remotely), e.g., via a secure browser service. In such embodiments, SaaS applications 510 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of resource feed(s) 506) for assessment of its security risk by a web filtering service. For approved URLs, the specialized browser may be permitted to access the link. For suspicious links, however, the web filtering service may have client interface service 516 send the link to a secure browser service, which may start a new virtual browser session with client 202, and thus allow the user to access the potentially harmful linked content in a safe environment.

In some embodiments, in addition to or in lieu of providing user 526 with a list of resources that are available to be accessed individually, as described above, user 526 may instead be permitted to choose to access a streamlined feed of event notifications and/or available actions that may be taken with respect to events that are automatically detected with respect to one or more of the resources. This streamlined resource activity feed, which may be customized for each user 526, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to client 202 to notify user 526 of something that requires the user's attention (e.g., approval of an expense report, new course available for registration, etc.).

Enhanced Security Mechanism for File Access

Aspects of the present disclosure describe an enhanced security mechanism and method for bridging the resource accessor and resource creator with (near) real-time sharable resource accessing. The described mechanism and method not only apply to file sharing, but may apply generally to many other areas such as microapps, Citrix virtual apps and desktops (CVAD), SaaS URL/subpages/reports, and/or SaaS in the marketplace or in workspace that share data between different sharing resources.

Figure 6:
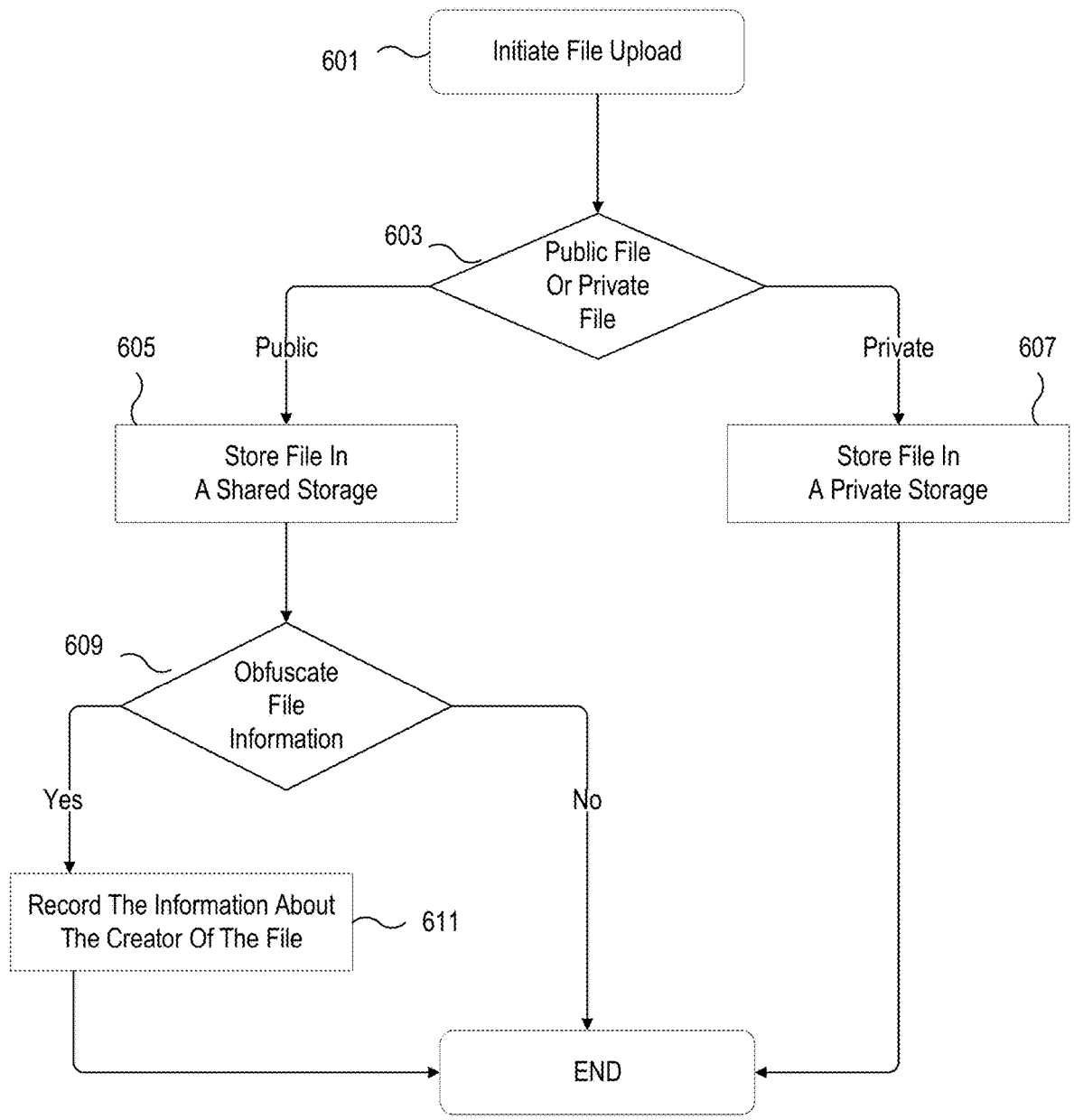
FIG. 6 depicts a flowchart showing an example method for uploading a file to a network storage device that may be used in accordance with one or more illustrative aspects described herein.

FIG. 6 depicts a flowchart showing an example method for uploading a file (or any other resource or data) to a network storage device that may be used in accordance with one or more illustrative aspects described herein. The example method may be performed, for example, by a cloud computing device described in connection with FIG. 8 or a client device (e.g., remote computers 107, 109, client machine 240, client 202). The steps of the example method are described as being performed by particular computing devices for the sake of simplicity, but the steps may be performed by any other computing device.

At step 601, a client device (e.g., a device associated with a file owner or a resource creator, remote computers 107, 109, client machine 240, client 202) may upload a file to a network storage device (e.g., data server 103, server 206, data storage devices 404, resource feed 504). The network storage device may be an online information storage system (e.g., a system of record) such as online file-sharing platforms ShareFile, Google Drive, or Box. The network storage device will be illustrated in greater detail below. A file owner may use an application/platform (e.g., Citrix Workspace) executed on the client device to upload the file. The client device may be connected to the network storage device via a network such as the wide area network 101.

At step 603, input may be received on the client device indicative of whether to upload the file privately or publicly. The network storage device may include a shared (public) storage for shared files and a private storage for private files. The private storage may be only visible and accessible to the file owner (uploader) and the public/shared storage may be accessible to everyone or a group of designated users or user devices.

At step 605, if the input indicates to upload the file publicly, the file may be stored on the shared storage. As a result, other users may be able to access the files stored on the shared storage. However, the client device may control whether a specific user may be able to access the file. For example, the file owner may use the client device to create an access policy and allow only a group of designated users to access the file (e.g., users within a specific enterprise can view and edit) based on the access policy. The client device may also control whether other users can find the file on the network storage device based on the access policy. In addition, the client device may control whether other users can edit, comment on, or only view the file based on the access policy or a permission setting on the file. For example, the client device may receive a file or folder permission setting that gives one or more users permissions to access the file or folder. The permission may indicate whether the users are allowed to edit, comment on, or only view the file. In some embodiments, changing folder permissions may change the general permissions of any subfolder and file that has not been specifically set. Additional access control methods will be illustrated in greater detail below.

At step 607, if the input indicates to upload the file privately, the file may be stored on the private storage. The private storage may be only visible and accessible to the file owner (uploader).

At step 609, after the file is stored on the shared storage, the file owner may choose whether to obfuscate file information. For example, the client device may receive an input that indicates to upload the file anonymously (e.g., hide user information associated with the file owner). The user information such as user identity may be hidden from other users or a specific group of users based on a user preference.

Figure 7:
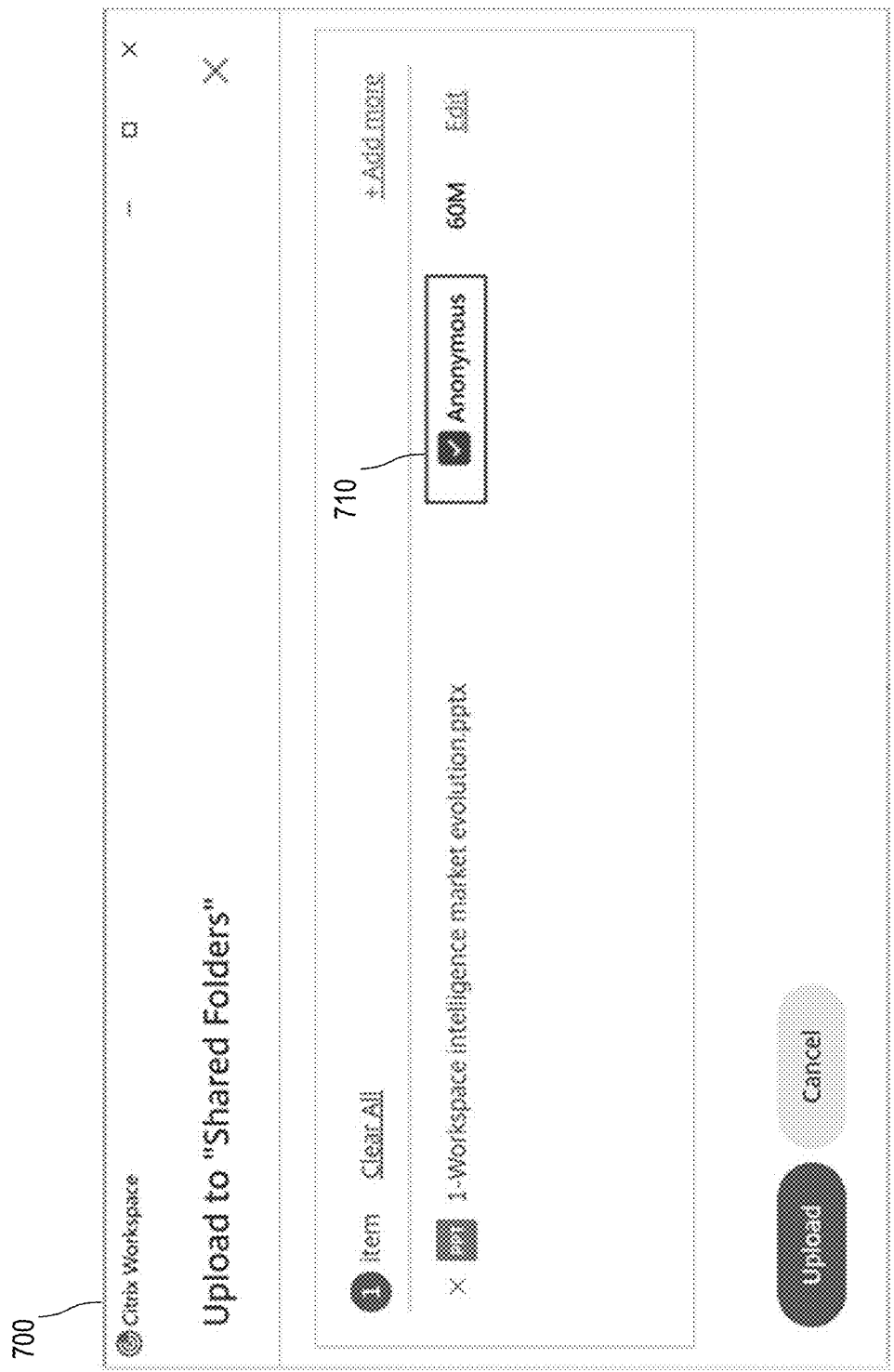
FIG. 7 depicts an example graphical user interface for anonymously uploading a file to a network storage device that may be used in accordance with one or more illustrative aspects described herein.

FIG. 7 depicts an example graphical user interface for anonymously uploading a file to a network storage device that may be used in accordance with one or more illustrative aspects described herein. Referring to FIG. 7, a graphical user interface 700 may include text and/or other information indicating a choice of uploading a file anonymously. For example, a checkbox 701 associated with a file name (e.g., "Workspace intelligence market evolution.pptx") may allow the file owner to upload the file anonymously. Alternatively or additionally, the graphical user interface 700 may allow the file owner to use a unique identifier (e.g., a pseudonym) that enables other users to link different files to the same person.

In some embodiments, graphical user interface 700 may allow the file owner to choose a specific group of users that will not be able to view the identity of the file owner (e.g., any user that is outside an enterprise cannot view information about the file uploader and the full file title). As a result, the (true) identity of the file owner may not be seen by other users, which prevents unauthorized users from viewing the file and related file information. Therefore, the file owner's privacy is further protected and the security of the file may be further enhanced.

At step 611, after the user obfuscates the file information, the network storage device (e.g., a plugin in the network storage device) may record the creator of the file and other file information (e.g., file name, file upload date and time) in a database in a back-end application. This database may be accessible only by one or more network storage administrators.

In some embodiments, it may not be necessary to include a database that records information about the file owner and the file. For example, after the file is uploaded, the network storage device or the cloud computing device may erase any information about the file owner so that the identity of the file owner remains completely anonymous. Further, log files on the network storage device may contain no identifying information.

Figure 8:
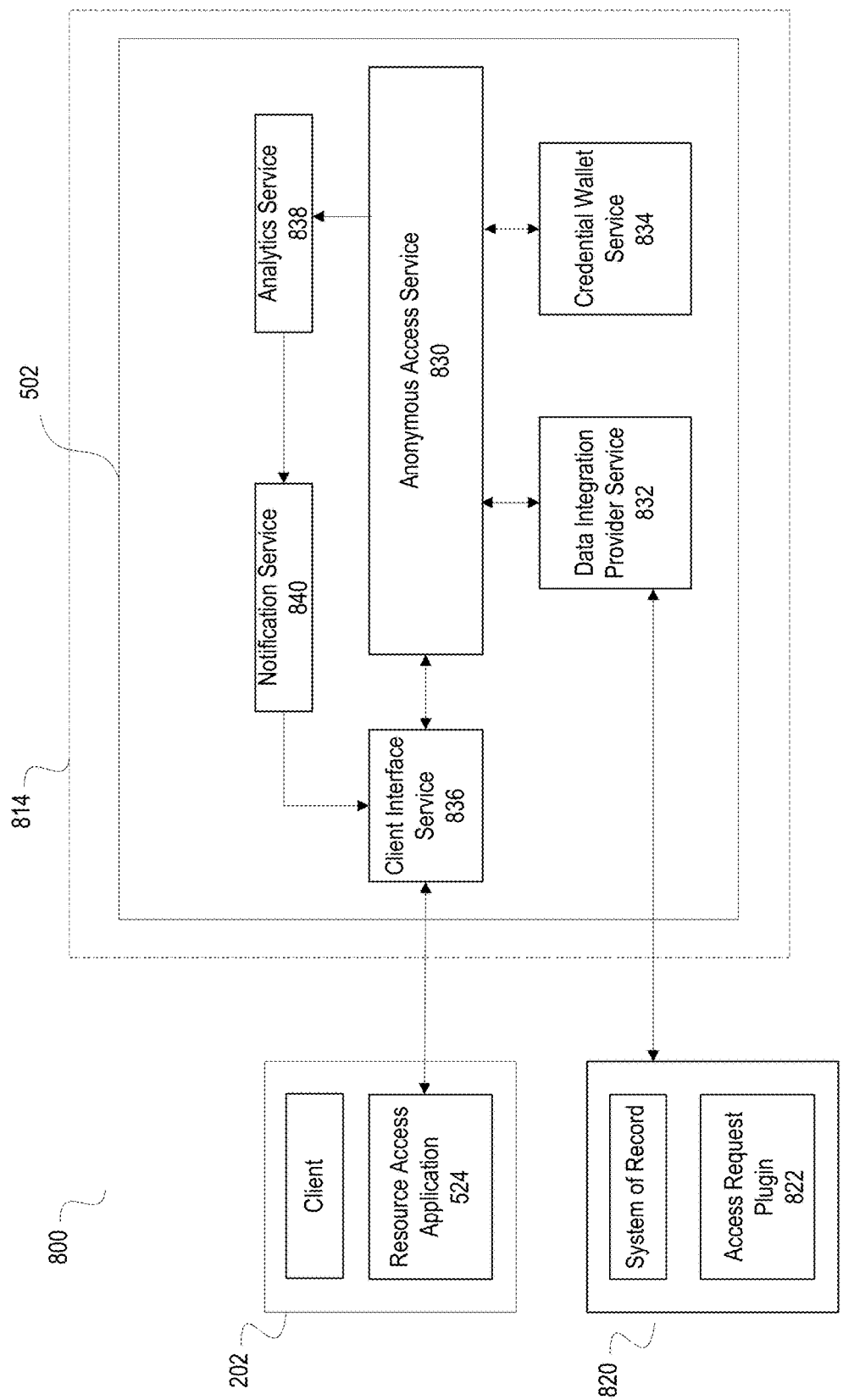
FIG. 8 depicts a schematic diagram showing an example system for providing secure access to one or more files that may be used in accordance with one or more illustrative aspects described herein.

FIG. 8 depicts a schematic diagram showing an example computing system for providing secure access to one or more files that may be used in accordance with one or more illustrative aspects described herein. FIG. 8 may be a block diagram similar to that shown in FIG. 5B but in which the available resources (e.g., SaaS applications, web applications, Windows applications, Linux applications, desktops, file repositories and/or file sharing systems, and other data) are represented by a single box 820, and further in which several different services are included within the resource management services block 502.

Referring to FIG. 8, a computing system 800 may include one or more devices. For example, computing system 800 may include a client 202 (e.g., an endpoint user device), a system of record 820 (e.g., a network storage device described in connection with FIG. 6, a resource provider, data server 103, server 206, data storage devices 404, resource feed 504), and a cloud computing device 814 (e.g., Citrix cloud server, cloud management server 410, data server 103). As explained below, the services shown in cloud computing device 814 may enable the provision of a near real-time access control process for client 202. In the example shown, the illustrated services may include an anonymous access service 830, a data integration provider service 832, a credential wallet service 834, a client interface service 836, an analytics service 838, and a notification service 840.

Referring to FIG. 8, client 202 may include one or more computing devices and/or other computer components (e.g., processors, memories, communication interfaces). Client 202 may be remote computers 107, 109, client machine 240, or any other endpoint user devices. In some embodiments, a file owner may use client 202 to upload a file. Specifically, the file owner may use resource access application 524 (e.g., Citrix Workspace) executing on client 202 to upload the file. FIG. 7 depicts an example graphical user interface for anonymously uploading the file, as discussed above. A file owner may also use client 202 to receive file access request notifications, and/or grant or deny the file access request.

System of record 820 may represent the applications and/or other resources with which resource management services 502 may interact. These applications/resources may be file sharing systems (e.g., ShareFile®), SaaS applications, legacy applications, or homegrown applications, and can be hosted on-premises or within a cloud computing environment. Connectors with out-of-the-box templates for several applications may be provided, and integration with other applications may additionally or alternatively be configured through a microapp page builder. Such a microapp page builder may, for example, connect to legacy, on-premises, and SaaS systems by creating streamlined user workflows via microapp actions. Resource management services 502, and in particular data integration provider service 832, may, for example, support REST API, JSON, OData-JSON, and 6ML. As explained in more detail below, data integration provider service 832 may also write back to system of record 820, for example, using OAuth2 or a service account. In some embodiments, system of record 820 may be integrated into client 202. For example, system of record 820 may function as Workspace files in Citrix Workspace App.

In addition, a plugin (e.g., access request plugin 822) may be developed and configured for implementation within system of record 820. Access request plugin 822 may be configured to record the file owner's information when the file owner chooses to share a file anonymously (e.g., the identity of the file owner is hidden from one or more users). Thus, the file owner information may not be available to consumers of the shared file. As an example, the plugin may be configured to store data structure as follows:

{file_name, creator_name}.

Further, access request plugin 822 may be configured to initiate a file access request. The file access request payload may be stored as follows:

{request_accessor_name, accessor_department, access_resource_name}.

Cloud computing device 814 may include one or more computing devices and/or other computer components (e.g., processors, memories, communication interfaces). For example, cloud computing device 814 may include resource management services 502, which may include one or more modules/services such as anonymous access service 830, data integration provider service 832, credential wallet service 834, client interface service 836 (e.g., client interface service 516), analytics services 838, and/or notification service 840. The modules described in FIG. 8 may be executed by cloud computing device 814. Generally, program modules may include routines, programs, objects, components, data structures, etc. that perform particular tasks or implement particular abstract data types when executed by a processor in a computer or other device.

Anonymous access service 830 may be configured to retrieve request data from system of record 820 via data integration provider service 832 based on credential information received from credential wallet service 834. Additional details of data integration provider service 832 and credential wallet service 834 will be illustrated in greater detail below. In order to notify client 202 of the request data, anonymous access service 830 may be configured to trigger notification service 840 to send the data to client 202.

Additional details of notification service 840 will be illustrated in greater detail below.

In some embodiments, anonymous access service provider 835 may be a microapp implemented in cloud computing device 814. In general, microapps are small, task-specific applications that deliver highly targeted functionality. These apps can allow users to accomplish single-purpose activities in a simple and quick manner Microapps may deliver actionable forms and notifications to other devices (e.g., a client device). Microapps may write back to source systems to ensure the information on the client device and source systems remain in sync with one another. Cloud computing device 814 may provide microapps service by using several components inside cloud computing device 814 that deliver actions from applications executed on the source systems (e.g., system of record 820) into client 202 or other channels/devices. Microapps services may include Microapps admin, the microapps server, and cache. In an example, Citrix Workspace Microapps service is a solution that delivers actions and notifications from end users' applications into users' Workspace or other channels.

In some embodiments, anonymous access service 830 may be a single use case made available to users to streamline functionality from complex enterprise applications. Microapps may, for example, utilize APIs available within SaaS, web, or home-grown applications allowing users to see content without a full launch of the application or to switch contexts. Absent such microapps, users would need to launch an application, navigate to the action they need to perform, and then perform the action. Microapps may streamline routine tasks for frequently performed actions and provide users the ability to perform actions within resource access application 524 without having to launch the native application. The system shown in FIG. 8 may, for example, aggregate relevant notifications, tasks, and insights, and thereby give the user a dynamic productivity tool. In some embodiments, the resource activity feed may be intelligently populated by utilizing machine learning and artificial intelligence (AI) techniques. Further, in some implementations, microapps may be configured within cloud computing environment 814, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Data integration provider service 832 may be configured to retrieve data from system of record 820 and write back data received from notification service 840. For example, data may be written back to system of record 820 and then resynchronized back to a cache located in cloud computing device 814. In some embodiments, data integration provider service 832 may interact with systems of record 820 to decrypt end user credentials and write back actions to systems of record 820 under the identity of the end user. The write-back actions may, for example, utilize a user's actual account to ensure all actions performed are compliant with data policies of the application or other resources being interacted with.

Credential wallet service 834 may be configured to store encrypted service credentials for system of record 820 and user credentials (e.g., OAuth2 tokens). Client interface service 836 may be configured to provide interfaces for communications between client and cloud computing device 814. Analytics service 838 may be configured to process the raw events received from anonymous access service 830 and send notifications to notification service 840. Notification service 840 may be configured to process any notifications it receives from analytics service 838 and send the notifications to client 202. In some implementations, notification service 840 may store the notifications in a database to be later served in a notification feed. Additionally or alternatively, notification service 840 may send the notifications out immediately to client 202 as a push notification.

Figure 9:
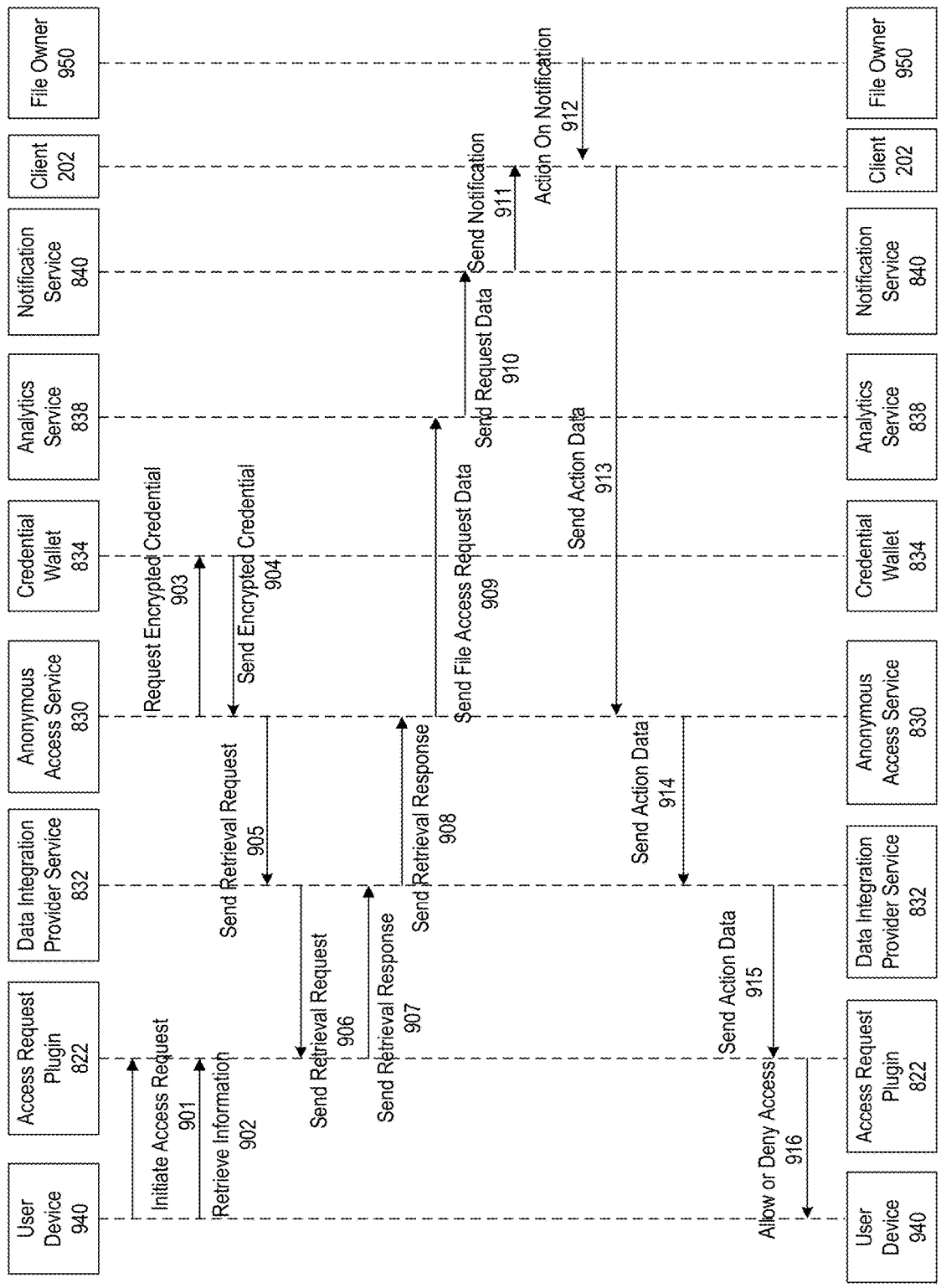
FIG. 9 depicts an illustrative event sequence for providing secure access to one or more files in accordance with one or more illustrative aspects described herein.

FIG. 9 depicts an illustrative event sequence for providing secure access to one or more files in accordance with one or more illustrative aspects described herein. Referring to FIG. 9, at step 901, a user (e.g., file requester) may use a user device 940 (e.g., remote computers 107, 109, client machine 240, mobile device 502) to initiate a file access request.

In some embodiments, an input may be received from file owner 950 to initiate an upload request as an anonymous author (e.g., hide the file owner information from other users), system of record 820 may set a field that identifies the creator or owner of the file in a user interface as anonymous. For example, system of record 820 may present graphical user interface 700 that includes text and/or other information indicating a choice of uploading a file anonymously, as discussed above.

Figure 10:
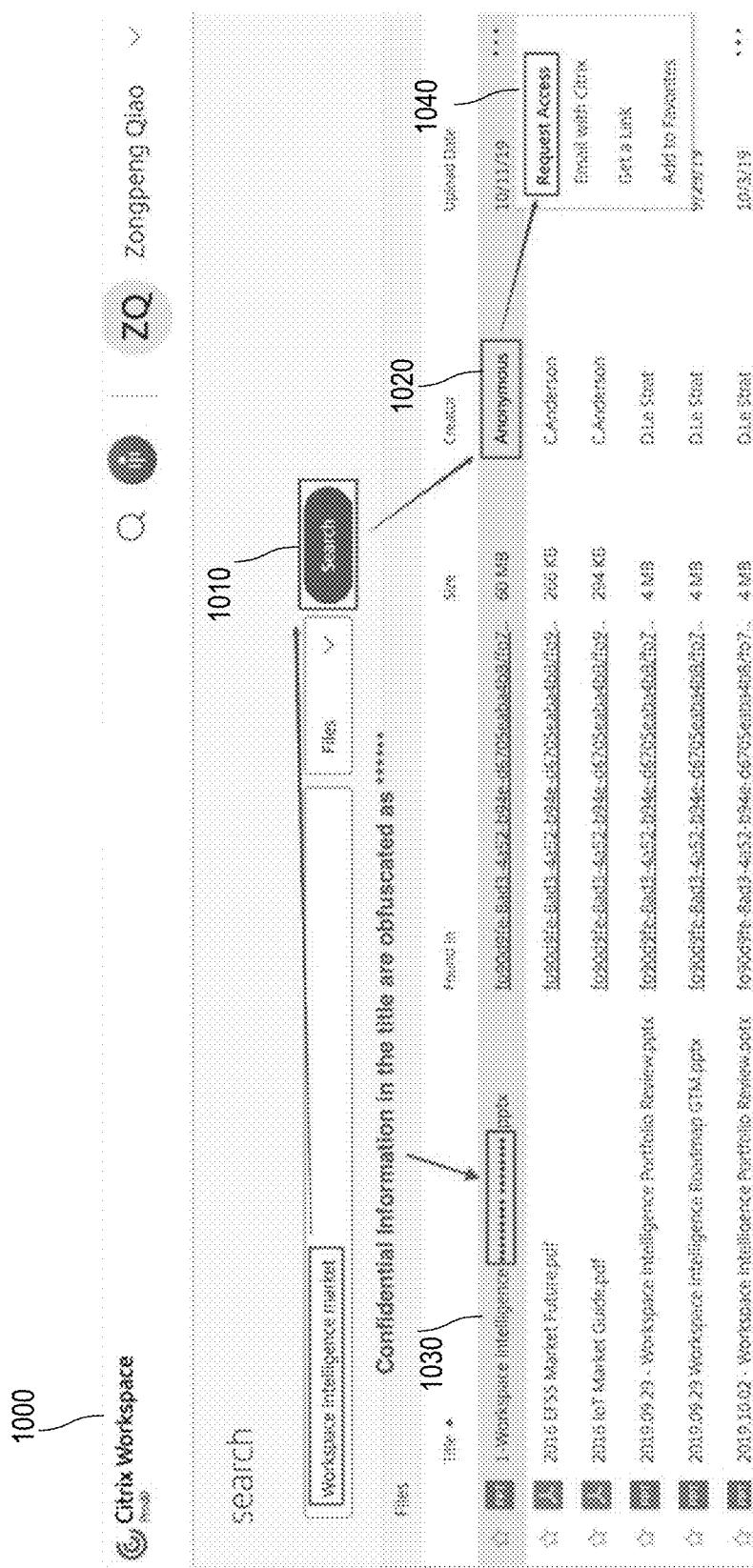
FIG. 10 depicts an example graphical user interface for requesting access to a file stored on a network storage device that may be used in accordance with one or more illustrative aspects described herein.

FIG. 10 depicts an example graphical user interface for requesting access to a file stored on system of record 820. As shown in FIG. 10, a creator field 1020 indicates that file owner 950 may be an anonymous author. Even if the file is stored on a shared storage, file owner 950 may not allow a specific group of users to access the file. Therefore, file owner 950 may authorize other users (e.g., to pre-select authorized users) to access the file and send a notification (e.g., an email) to the authorized users. For example, file owner 950 may use role-based access role (RBAC) to restrict file access based on the roles of individual users within an enterprise. File owner 950 may also control other users' operations (e.g., read, view, edit, download, share) on the file. If file owner 950 does not authorize a user to access the file, the user may need to initiate an access request, as shown at step 901, and send the access request to the file owner for approval.

In some embodiments, a user may use user device 940 or any other user devices to request access to a file shared on system of record 820. For example, the user may right-click the creator field (e.g., anonymous) and click on "request access" 1040. The request may be sent to file owner 950. The transmission of the request to the file owner will be illustrated in greater detail below. Because users may not access the shared file without requesting permission, enhanced security for the file may be provided.

Referring to FIG. 10, graphical user interface 1000 may include a search bar 1010 that allows a user (e.g., a file requester) to search a file stored on a shared storage. The user may search a file using at least part of the file title and/or other information on user device 940 or on a network storage device. The current technology does not permit users to search or find anonymous files. To solve this problem, in some embodiments, even if the file owner information is hidden from other users, other users may still be able to search the file uploaded by the file owner. For example, even if file owner information is obfuscated, the file may be stored on a share storage that is accessible (e.g., searchable) by other users. Resource management services 502 may provide users with the ability to search (e.g., a keyword search) for relevant information across all files and applications. Thus, other users may find the file by searching a part of the file title and subsequently request access to the file. This functionality allows users to access an anonymous file while maintaining the anonymity of the file owner.

In addition, graphical user interface 1000 may include text and/or other information indicating the search results. For example, one or more files that match the search query (e.g., "Workspace intelligence market") may be displayed. Further, the location, size, and/or an upload date of the one or more files may be displayed.

In some embodiments, only a portion of the file title 1030 may be visible to the user. File owner 950 may choose to hide a part of the file title during an uploading process of the file. For example, file owner 950 may obfuscate confidential information included within the file title as "****." An organization or file owner 950 may create and store a confidential keywords dictionary (e.g., database). The dictionary may include confidential keywords that may be hidden from one or more users. When a file is being uploaded and marked as "shared" instead of "private," the file title may be scanned against the confidential keyword dictionary. Any words in the title that are in the list of confidential keywords may be obfuscated and shown as "**." In some embodiments, only after a file access request is approved by file owner 950**, the full title may be visible to the file requester.

Referring back to FIG. 9, at step 902, access request plugin 822 may initiate the file access request. In addition, access request plugin 822 may retrieve, based on the file access request, the file access request information such as user information and file information. As discussed above, access request plugin 822 may store the retrieved information. The user information may include the file requester's name, title, and/or group. The file information may include the title (e.g., a full title or a redacted title) of the requested file and the intended action on the requester file (e.g., read, view, write, download, edit, comment, share).

At step 903, anonymous access service 830 may request encrypted credential (e.g., service account credentials) for system of record 820 stored in credential wallet service 834. At step 904, anonymous access service 830 may receive the encrypted credential (e.g., an encrypted Oauth2 token) for system of record 820 from credential wallet service 834. At step 905, anonymous access service 830 may initiate and send a retrieval request to data integration provider service 832 and may request a sync with the data integration provider service 832.

At step 906, data integration provider service 832 may send the retrieval request for file access request information to system of record 820. For example, data integration provider service 832 may decrypt the service account credentials and may use those credentials to retrieve data from system of record 820.

At step 907, system of record 820 may send a retrieval response including access request data to data integration provider service 832. At step 908, data integration provider service 832 may transfer the retrieval response to anonymous access service 830. At step 909, anonymous access service 830 may send the access request data to analytics service 838. For example, anonymous access service 830 may parse (e.g., analyze a string of symbols in the response) the retrieval response, extract the access request data, and send the access request data to analytics service 838. Specifically, anonymous access service 830 may parse the retrieval response to identify the access request data (e.g., the requested file, information about the file requester). In addition, anonymous access service 830 may generate more information based on the name of the requester (e.g., the organization of the requester, the location of the requester, a project associated with the requester). At step 910, analytics service 838 may record the request and send the access request data to notification service 840.

At step 911, notification service 840 may send a notification to client 202. The notification may be generated based on the file access request. For example, the notification may indicate that a user has sent a file access request. Client 202 may render or push the notification to file owner 950. In some embodiments, notification service 840 may send a notification immediately to file owner 950 after receiving the access request data, so that the file requester may receive an instant response (e.g., an email or a message displayed on a user interface on user device 940) from file owner 950.

Figure 11:
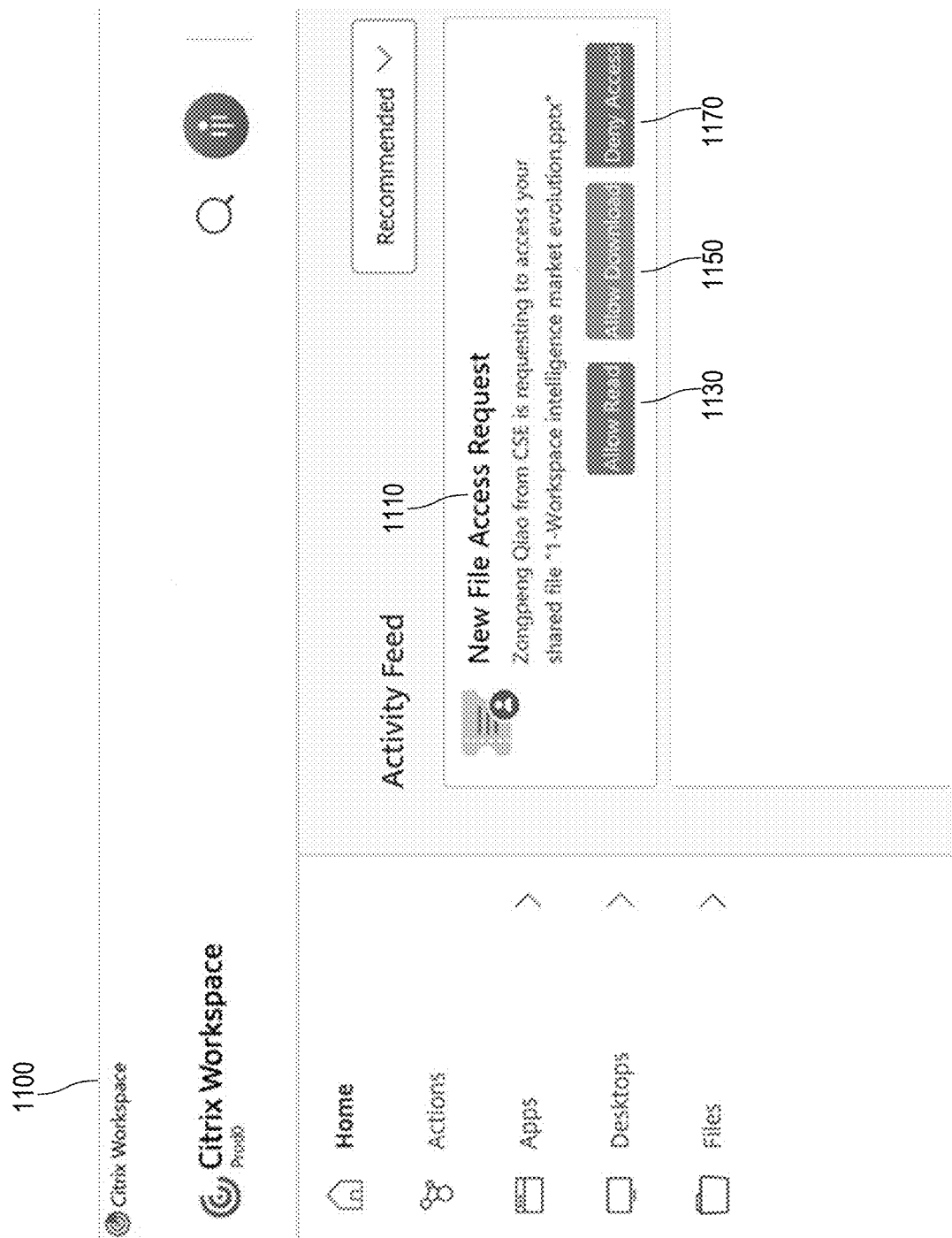
FIG. 11 depicts an example graphical user interface for notifying a file owner of a file access request that may be used in accordance with one or more illustrative aspects described herein.

FIG. 11 depicts an example graphical user interface for notifying a file owner of a file access request that may be used in accordance with one or more illustrative aspects described herein. Referring to FIG. 11, a graphical user interface 1100 on client 202 may include text and/or other information indicating a new file access request 1110. New file request 1110 may indicate the requester's name and organization, and the requested file information (e.g., "Zongpeng Qiao from CSE is requesting to access your shared file '1-Workspace intelligence market evolution-.pptx'"). New file request 1110 may also include reasons for accessing the shared file.

Referring back to FIG. 9, at step 912, file owner 950 may perform an action on the file access request. For example, file owner 950 may grant or deny the file access request. In particular, file owner 950 may indicate what specific actions (e.g., read, comment, view, write, edit, download, share) are allowed and/or what actions are prohibited.

Referring to FIG. 11, graphical user interface 1100 may include text and/or other information (e.g., action buttons) that allows the file owner to grant or deny the new file request (e.g., allow read 1130, allow download 1150, deny access 1170). Further, the graphical user interface 1100 may include text and/or other information (not shown) that allows the file owner to choose specific actions allowed to be performed on the file (e.g., view, write, edit, comment, download, share).

In some embodiments, graphical user interface 1100 may be presented in an application/platform (e.g., Citrix Workspace) running on an endpoint device of the file owner. The application may prompt and/or otherwise present a message (notification) that indicates the new file access request.

In some embodiments, file owner 950 may not need to perform an action on the file access request. Client 202 may create and store an access policy and automatically determine whether the file access request should be granted or denied based on the access policy. For example, client 202 may use RBAC to automatically grant or deny the access based on the access request data (e.g., the file requester's group or title). Thus, there may not be a delay between the initiation of a file access request and a decision on the file access request. Therefore, the file requester may receive an instant decision on the file access request.

Referring back to FIG. 9, at step 913, client 202 may send action data to anonymous access service 830. The action data may include actions performed by file owner 950. For example, client 202 may receive an input from file owner 950 via graphical user interface 1100. The input may indicate whether file owner 950 grants or denies the file access request. The input may also set a time range during which the file requester is allowed to access the file.

At step 914, anonymous access service 830 may send the action data to data integration provider service 832. At step 915, data integration provider service 832 may send the action data to access request plugin 822. At step 916, access request plugin 822 may allow or deny the file access request based on the action data.

Figure 12:
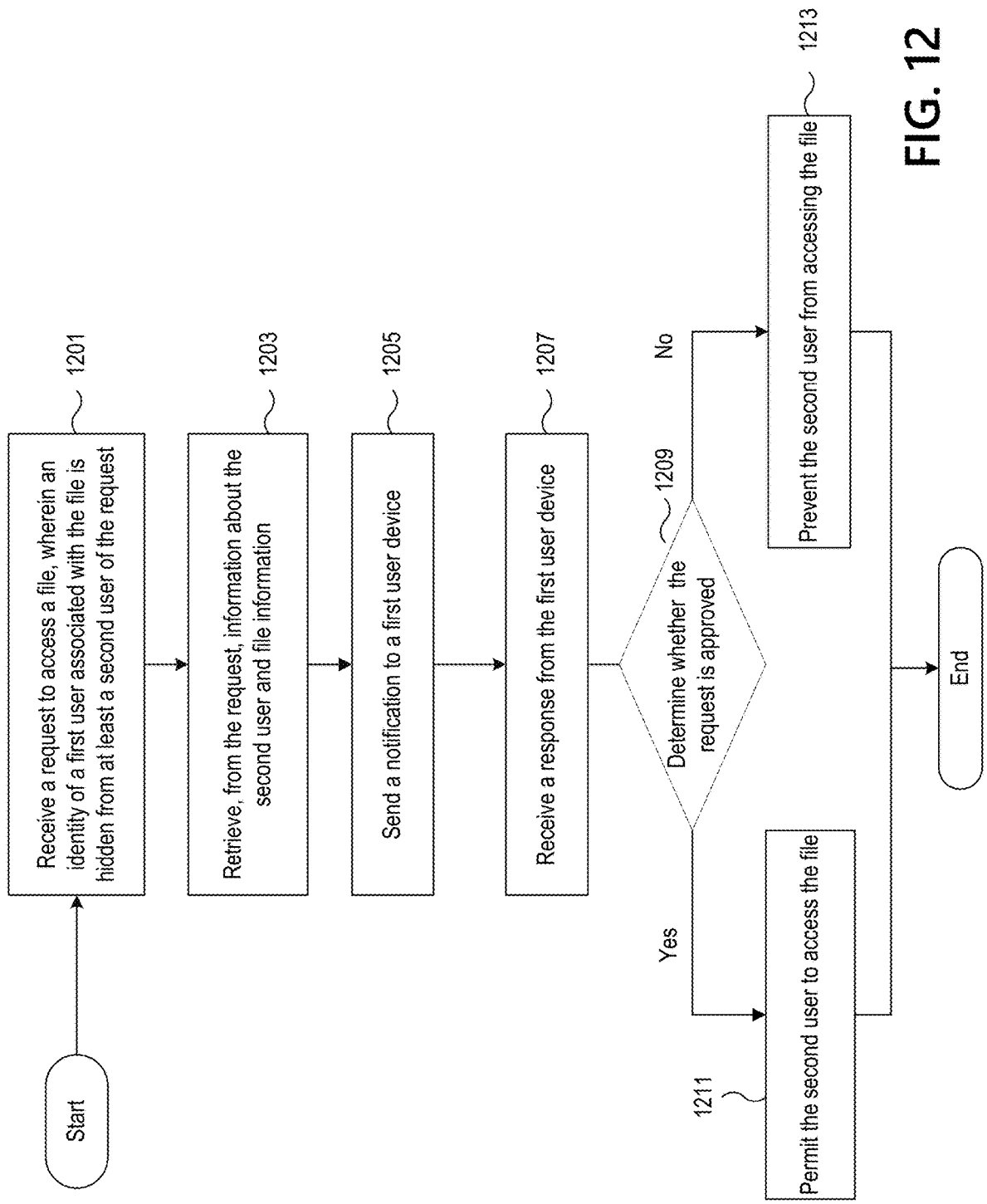
FIG. 12 depicts a flowchart showing an example method for providing secure access to one or more files in accordance with one or more illustrative aspects described herein.

FIG. 12 is a flowchart showing an example method for providing secure access to one or more files. The example method may be performed, for example, by a computing device (e.g., cloud computing device 830 described in connection with FIG. 8). The steps of the example method are described as being performed by particular computing devices for the sake of simplicity, but the steps may be performed by any other computing device.

At step 1201, a computing device may receive a request to access a file. The file may be stored on a network storage device accessible by the computing device. An identity of a first user of the file may be hidden from at least a second user of the request. At step 1203, the computing device may retrieve, from the request, information about the second user and requested file. At step 1205, the computing device may send a notification to a first user device to notify the first user. The notification may comprise the second user information and the file information. At step 1207, the computing device may receive a response from the first user device. The response may comprise an indication whether the request to access the file is approved or denied. At step 1209, the computing device may determine if the response indicates that the request is approved. At 1211, in response to the response indicating the request is approved, the computing device may grant the request to access the file and permit the second user to access the file. At step 1213, in response to the response indicating the request is denied, the computing device may deny the request to access the file and prevent the second user from accessing the file.

Figure 13:
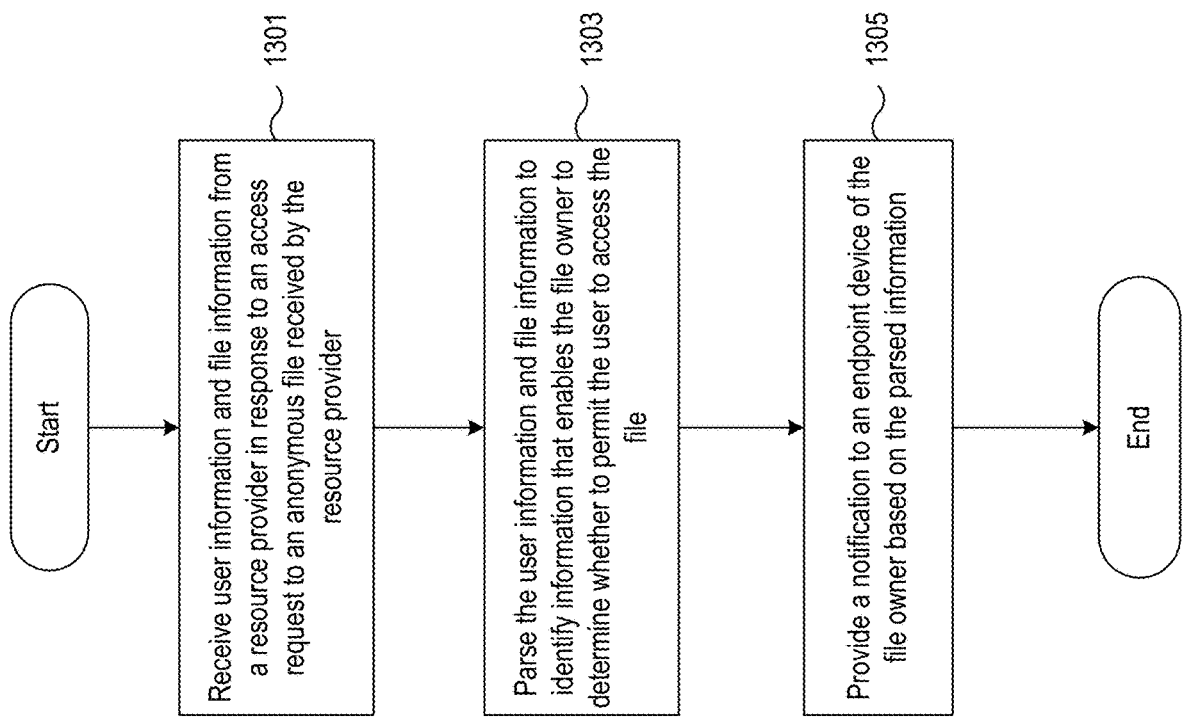
FIG. 13 depicts a flowchart showing an example method for providing secure access to one or more files in accordance with one or more illustrative aspects described herein.

FIG. 13 is a flowchart showing an example method for providing secure access to one or more files. The example method may be performed, for example, by a computing device (e.g., cloud computing device 830 described in connection with FIG. 8). The steps of the example method are described as being performed by particular computing devices for the sake of simplicity, but the steps may be performed by any other computing device.

At step 1301, a computing device may receive data from a resource provider (e.g., data server 103, server 206, data storage devices 404, resource feed 504) in response to an access request to an anonymous file received by the resource provider. The data may include information about a user of a client device that made the request for a file and information of the file. The request may be for access to the file and made by the user with an owner of the requested file being unknown to the user.

At step 1303, the computing device may parse the received data to identify information that enables the owner to determine whether to permit the user to access the file. For example, the computing device may parse the received data to identify a subset of data that is configured to enable the owner to determine whether to permit the user to access the file. In some embodiments, the subset of data may include the user's name and/or user's group. For example, if the user belongs to a specific group (e.g., management committee of a company), the owner may automatically permit the user to access the file based on the group. The subset of data may also include user's reason to access the file, which may enable the owner to determine whether to permit the user to access the file.

At step 1305, the computing device may provide a notification to an endpoint device of the owner. The notification may include at least some of the subset of data.

The following paragraphs (M1) through (M13) describe examples of methods that may be implemented in accordance with the present disclosure.

(M1) A method comprising: receiving, by a computing device, a request to access a file, wherein the file is stored on a network storage device accessible by the computing device, and wherein an identity of a first user associated with the file is hidden from at least a second user of the request; retrieving, from the request, information about the second user and file information; sending a notification to a first user device of the first user, wherein the notification comprises the information of the second user and the file information; receiving a response from the first user device, wherein the response comprises an indication of approval or denial of the request; and in response to approval of the request, permitting the second user to access the file, or in response to denial of the request, preventing the second user from accessing the file.

(M2) A method may be performed as described in paragraph (M1) wherein the retrieving comprises retrieving, by a micro application executed on the computing device and from the request, the information about the second user and the file information.

(M3) A method may be performed as described in either paragraph (M1) or (M2) wherein the sending comprises sending the notification to an application installed on the first user device, and the file is uploaded using the installed application.

(M4) A method may be performed as described in any of paragraphs (M1) through (M3) wherein the request to access the file is initiated by a plugin installed on the network storage device.

(M5) A method may be performed as described in any of paragraphs (M1) through (M4) wherein the network storage device is configured to present a user interface that includes an option for uploading the file anonymously.

(M6) A method may be performed as described in any of paragraphs (M1) through (M5) wherein at least a portion of a name of the file is hidden from at least the second user.

(M7) A method may be performed as described in any of paragraphs (M1) through (M6) further comprising: after retrieving the information about the second user and the file information, causing display of the notification via a user interface on the first user device.

(M8) A method comprising: receiving, by a computing device, data from a resource provider in response to a request received by the resource provider, the data including information about a user of a client device that made the request for a file and information about the file, and the request being for access to the file and made by the user with an owner of the requested file being unknown to the user; parsing, by the computing device, the received data to identify a subset of data, the subset of data configured to enable the owner to determine whether to permit the user to access the file; and providing, by the computing device, a notification to an endpoint device of the owner, the notification including at least some of the subset of data.

(M9) A method may be performed as described in paragraph (M8) further comprising: receiving a response from the endpoint device of the owner, the response comprising an indication of approval or denial of the request.

(M10) A method may be performed as described in paragraph (M9) further comprising in response to the response indicating the request is approved, allowing the user to access the file, or in response to the response indicating the request is denied, preventing access to the file by the user.

(M11) A method may be performed as described in any of paragraphs (M8) through (M10) wherein the subset of data comprises at least a name of the user of the client device.

(M12) A method may be performed as described in any of paragraphs (M8) through (M11) wherein the file is uploaded to the resource provided using the endpoint device of the owner.

(M13) A method may be performed as described in any of paragraphs (M8) through (M12) wherein the request for access to the file comprises at least one of a request for read access, a request for write access, a request for download access, a request for share access, and a request for comment access.

The following paragraphs (A1) through (A7) describe examples of apparatuses that may be implemented in accordance with the present disclosure.

(A1) An apparatus comprising one or more processors; and memory storing instructions that, when executed by the one or more processors, cause the apparatus to receive a request to access a file, wherein the file is stored on a network storage device accessible by the apparatus, and wherein an identity of a first user associated with the file is hidden from at least a second user of the request; retrieve, from the request, information about the second user and file information; send a notification to a first user device of the first user, wherein the notification comprises the information about the second user and the file information; receive a response from the first user device, wherein the response comprises an indication of approval or denial of the request; and in response to approval of the request, permit the second user to access the file, or in response to denial of the request, prevent the second user from accessing the file.

(A2) An apparatus may be implemented as described in paragraph (A1) wherein the instructions, when executed by the one or more processors, further cause the apparatus to retrieve, by a micro application executed on the apparatus and from the request, the information of the second user and the file information.

(A3) An apparatus may be implemented as described in paragraph (A1) or paragraph (A2) wherein the instructions, when executed by the one or more processors, further cause the apparatus to send the notification to an application installed on the first user device, and wherein the file is uploaded using the installed application.

(A4) An apparatus may be implemented as described in any of paragraphs (A1) through (A3) wherein the request to access the file is initiated by a plugin installed on the network storage device.

(A5) An apparatus may be implemented as described in any of paragraphs (A1) through (A4) wherein the request to access the file comprises at least one of a request for read access, a request for write access, a request for download access, a request for share access, and a request for comment access.

(A6) An apparatus may be implemented as described in any of paragraphs (A1) through (A5) wherein at least a portion of a name of the file is hidden from at least the second user.

(A7) An apparatus may be implemented as described in any of paragraphs (A1) through (A6) wherein the instructions, when executed by the one or more processors, further cause the apparatus to cause display of the notification via a user interface on the first user device, after retrieving the information about the second user and the file information.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
   receiving, by a computing device, a request to access a file, wherein the file is stored on a network storage device accessible by the computing device, and wherein an identity of a first user associated with the file is hidden from at least a second user of the request;
   retrieving, from the request, information about the second user and file information;
   generating a notification, wherein the notification comprises the information about the second user and the file information, and wherein the notification is stored in a database;
   sending the notification to a first user device of the first user, wherein the notification comprises a push notification identifying the information about the second user and the file information;
   receiving a response from the first user device, wherein the response comprises an indication of approval or denial of the request; and
   in response to approval of the request, permitting the second user to access the file, or
   in response to denial of the request, preventing the second user from accessing the file,
   wherein the network storage device is configured to present a user interface that includes an option for uploading the file anonymously.

2. The method of claim 1, wherein the retrieving comprises retrieving, by a micro application executed on the computing device and from the request, the information about the second user and the file information.

3. The method of claim 1, wherein
   the sending comprises sending the notification to an application installed on the first user device, and
   the file is uploaded using the installed application.

4. The method of claim 1, wherein the request to access the file is initiated by a plugin installed on the network storage device.

5. The method of claim 1, wherein at least a portion of a name of the file is hidden from at least the second user.

6. The method of claim 1, further comprising:
   after retrieving the information about the second user and the file information, causing display of the notification via a user interface on the first user device.

7. The method of claim 1, wherein a title of the file is obfuscated by the first user, and wherein the identity of the first user and the title of the file is stored in a database.

8. An apparatus comprising:
one or more processors; and
memory storing instructions that, when executed by the one or more processors, cause the apparatus to:
  receive a request to access a file, wherein the file is stored on a network storage device accessible by the apparatus, and wherein an identity of a first user associated with the file is hidden from at least a second user of the request;
  retrieve, from the request, information about the second user and file information;
  generate a notification, wherein the notification comprises the information about the second user and the file information, and wherein the notification is stored in a database;
  send a notification to a first user device of the first user, wherein the notification comprises a push notification identifying the information about the second user and the file information;
  receive a response from the first user device, wherein the response comprises an indication of approval or denial of the request; and
  in response to approval of the request, permit the second user to access the file, or
  in response to denial of the request, prevent the second user from accessing the file,
  wherein the network storage device is configured to present a user interface that includes an option for uploading the file anonymously.

9. The apparatus of claim 8, wherein the instructions, when executed by the one or more processors, further cause the apparatus to
retrieve, by a micro application executed on the apparatus and from the request, the information about the second user and the file information.

10. The apparatus of claim 8, wherein the instructions, when executed by the one or more processors, further cause the apparatus to
send the notification to an application installed on the first user device, and
wherein the file is uploaded using the installed application.

11. The apparatus of claim 8, wherein the request to access the file is initiated by a plugin installed on the network storage device.

12. The apparatus of claim 8, wherein the request to access the file comprises at least one of a request for read access, a request for write access, a request for download access, a request for share access, and a request for comment access.

13. The apparatus of claim 8, wherein at least a portion of a name of the file is hidden from at least the second user.

14. The apparatus of claim 8, wherein the instructions, when executed by the one or more processors, further cause the apparatus to
cause display of the notification via a user interface on the first user device, after retrieving the information about the second user and the file information.

15. A method, comprising:
receiving, by a computing device, data from a resource provider in response to a request received by the resource provider, the data including information about a user of a client device that made the request for a file and information about the file, and the request being for access to the file and made by the user with an owner of the requested file being unknown to the user;
parsing, by the computing device, the received data to identify a subset of data, the subset of data configured to enable the owner to determine whether to permit the user to access the file;
generating, by the computing device, a notification, wherein the notification comprises the information about the second user and the file information, and wherein the notification is stored in a database; and
providing, by the computing device, the notification to an endpoint device of the owner, the notification including at least some of the subset of data, wherein the notification is a push notification,
wherein the resource provider is configured to present a user interface that includes an option for uploading the file anonymously.

16. The method of claim 15, further comprising:
receiving a response from the endpoint device of the owner, the response comprising an indication of approval or denial of the request.

17. The method of claim 16, further comprising:
in response to the response indicating the request is approved, allowing the user to access the file, or
in response to the response indicating the request is denied, preventing access to the file by the user.

18. The method of claim 15, wherein
the subset of data comprises at least a name of the user.

19. The method of claim 15, wherein
the file is uploaded to the resource provider using the endpoint device of the owner.

20. The method of claim 15, wherein
the request for access to the file comprises at least one of a request for read access, a request for write access, a request for download access, a request for share access, and a request for comment access.

* * * * *